(12) United States Patent
Chen et al.

(10) Patent No.: US 6,719,432 B2
(45) Date of Patent: Apr. 13, 2004

(54) OPTICAL ASSEMBLY FOR REAR PROJECTION TELEVISION

(75) Inventors: Kuo-Wen Chen, Hsin-Chu (TW); Fan-Chieh Chang, Hsin-Chu (TW); Chen-Wen Yang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 10/248,276

(22) Filed: Jan. 6, 2003

(65) Prior Publication Data

US 2003/0133083 A1 Jul. 17, 2003

(30) Foreign Application Priority Data

Jan. 11, 2002 (TW) ........................ 91200482 U

(51) Int. Cl.⁷ .................... G03B 21/22; G03B 21/28; G03B 21/14; H04N 9/31; H04N 3/22
(52) U.S. Cl. .................... 353/74; 353/77; 353/78; 353/79; 353/98; 353/99; 348/744; 348/745
(58) Field of Search ................ 353/15, 18, 74, 353/75, 77, 78, 79, 98, 99; 348/744, 745

(56) References Cited

U.S. PATENT DOCUMENTS

| 4,730,919 | A | * | 3/1988 | Schuch ........................ 353/79 |
| 5,408,283 | A | * | 4/1995 | Lee ............................. 353/77 |
| 5,521,659 | A | * | 5/1996 | Arnott ........................ 353/119 |
| 5,829,855 | A | * | 11/1998 | Uchiyama .................... 353/74 |
| 5,860,720 | A | * | 1/1999 | Negishi et al. ............... 353/74 |
| 5,890,787 | A | * | 4/1999 | McNelley et al. ............ 353/28 |
| 6,046,860 | A | * | 4/2000 | Hirata et al. ................ 359/649 |
| 2003/0179349 | | * | 9/2003 | Fukunaga et al. ........... 353/99 |

* cited by examiner

Primary Examiner—Rodney Fuller
Assistant Examiner—Melissa J Koval
(74) Attorney, Agent, or Firm—Winston Hsu

(57) ABSTRACT

The present invention comprises a carrier, an optical engine disposed on the carrier, and a hood member coupled to the carrier at the front end of the optical engine. The hood member has an inlet coupled to the optical engine and an outlet sealed with a screen. At least one mirror is placed in an optical path between the optical engine and the screen for reflecting a beam from the optical engine, and is disposed with an adjusting bolt at its backside for adjusting. The hood member wraps the optical path from the optical engine to the screen for keeping the optical engine outside and preventing the external dust, moisture, and temperature.

1 Claim, 4 Drawing Sheets

OPTICAL ASSEMBLY FOR REAR PROJECTION TELEVISION

BACKGROUND OF INVENTION

1. Field of the Invention

The present invention relates to a rear projection television, more particularly to anoptical assembly for rear projection television.

2. Description of the Related Art

In recent years, as the opto-electronic technology grows rapidly, the visualization of information becomes more and more important. The significance and demand for rear projection television as a display device increases drastically. Therefore, with the consideration of mass production and labor cost, the way of conveniently and quickly assembling a rear projection television, saving manpower and cost, and maintaining a high-brightness and high-resolution video quality to provide comfortable viewing screens for users, and being capable of quickly and conveniently processing the after-sale service and maintenance to strengthen the competitiveness in the market and popularly accepted by the consumer's market has become an important subject of the research and development in the industry.

Please refer to FIG. 1 for the overall optical system structure of a prior-art rear projection television. A screen 10 in the front, a base 11 at the bottom, and a rear cover 12 at the backside constitute the interior of the rear projection television; wherein the interior of the rear projection television has a carrier 13 on the base 11, and the carrier 13 has an optical engine 14 on it. A first mirror 15 is fixed in the front of the optical engine 14, and furthermore a second mirror 16 is disposed on the inner side of the rear cover 12 at the back of the screen 10. The operation of the optical system of the rear projection television is by means of generating a beam with video information from the optical engine 14 on the carrier 13 and projecting the beam onto the first mirror 15. The beam is then reflected onto the second mirror 16 from the first mirror 15, and finally onto the screen 10, which constitutes the optical system projection architecture.

Since every component of the optical system of the rear projection television must have an accurate relative position and a projection angle to assure the distortion-free and aberration-free image produced by the optical system of the rear projection television, and such system has to be assembled in a clean room to prevent the optical components from being contaminated and to maintain a high-brightness and high-resolution video quality. However, the components of the optical system of the rear projection television such as the optical engine 14, the first mirror 15, the second mirror 16, and the screen 10 are fixed individually on different major component units; there is not only error in the manufacture of the components, but also error in the manufacturing of the assembly. These errors will seriously affect the video quality of the screen. In the meantime, the illumination source and electronic components that easily generate heat are accommodated in the interior of the rear projection television with the optical components. Such arrangement is not only difficult to disperse heat, but the expansion and contraction due to temperature also affects the imaging quality of optical components. In addition, the whole set of the prior-art rear projection television has to be assembled in the clean room to prevent contamination by dust, and in turn will cause a higher manufacturing cost. It needs to disassemble the whole television set for the maintenance of optical components, which also makes the maintenance more difficult. Therefore, there are many shortcomings of the prior-art rear projection television, which require improvement.

SUMMARY OF INVENTION

The objective of the present invention is to provide an optical assembly for rear projection television, such that when the rear projection television is assembled, it minimizes the assembling error, and thus maintains good video quality.

The other objective of the present invention is to provide an optical assembly for rear projection television, which only requires unscrewing a small number of screws to remove the optical assembly, so that the optical system can be disassembled without affecting the relative position of the components of the optical system, which facilitates the maintenance very much.

A further objective of the present invention is to provide anoptical assembly for rear projection television wherein the projectingoptical components and heat generating components are separated, so that the video will not be affected by heat and thus maintains good video quality of the screen.

Another further objective of the present invention is to provide anoptical assembly for rear projection television, wherein the optical system has a sealed space so that when the rear projection television is assembled, only the optical system has to be assembled in a clean room, which can reduce the cost and make the maintenance simpler and more convenient.

To accomplish the aforementioned objectives, the rear projection television of the present invention comprises an optical assembly; an optical engine disposed on the lower carrier the optical assembly; a hood member coupled to an end of the carrier at the front end of the optical engine; an inlet disposed on the hood member, the inlet having an elastic sealed cover which allows the projection lens of the optical engine to be extended inside the hood member and closely wraps the external diameter of the projection lens; a first mirror disposed in front of the projection lens; a second mirror is disposed on the upper end of the inner side of the hood member along the optical path of the small reflective projection lens. A screen is coupled to the outlet of the hood member along the optical reflection path of the second mirror. Covering the components one by one by means of a hood member and a screen according to the size of the optical path and excluding the optical engine of the heat-generating element outside constitute a sealed space with an isolation of air from the exterior for preventing the external dust, moisture, and temperature. Thus, such arrangement constitutes an optical assembly of the present invention.

DETAILED DESCRIPTION

A preferred embodiment of the present invention will be explained with reference to the accompanying drawings.

Figure 1:
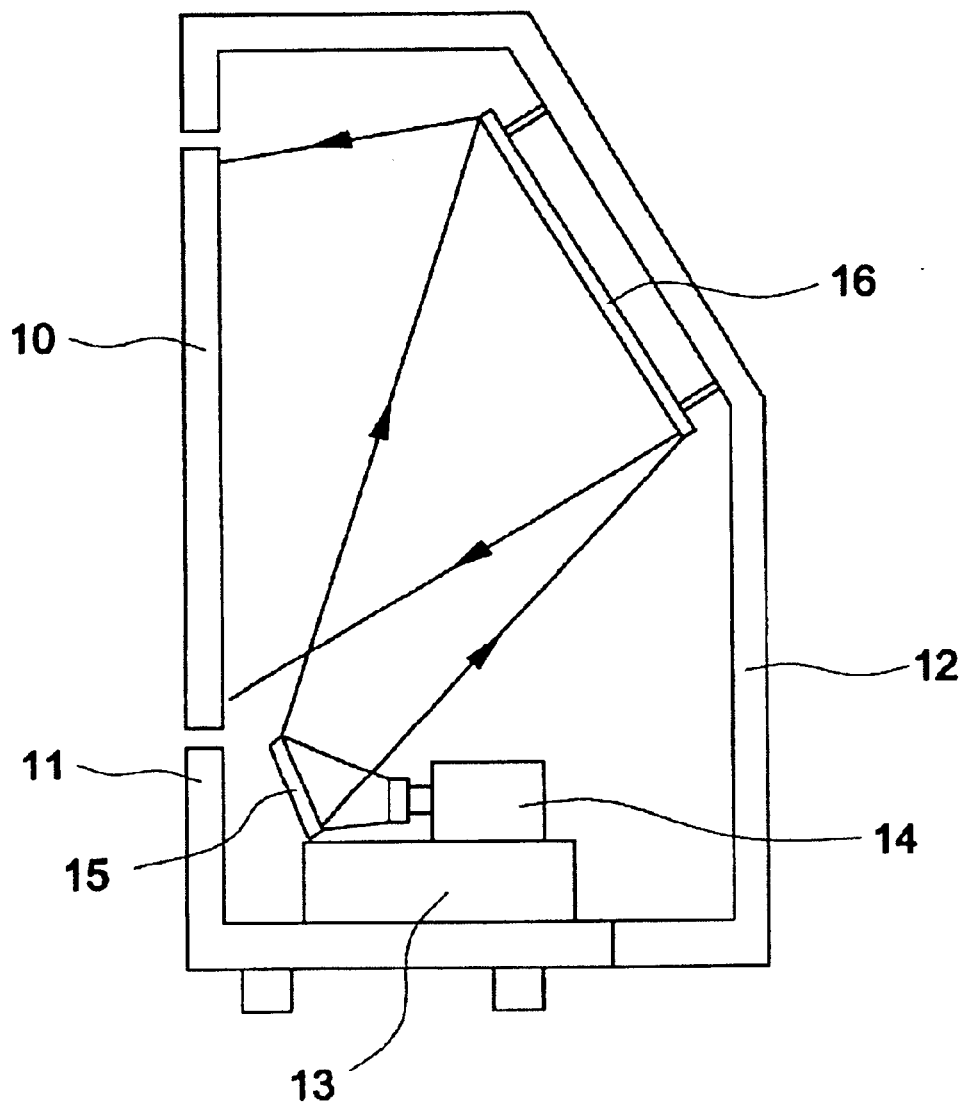
FIG. 1 is a cross-sectional diagram of an overall optical system structure of a prior-art rear projection television.
Figure 2:
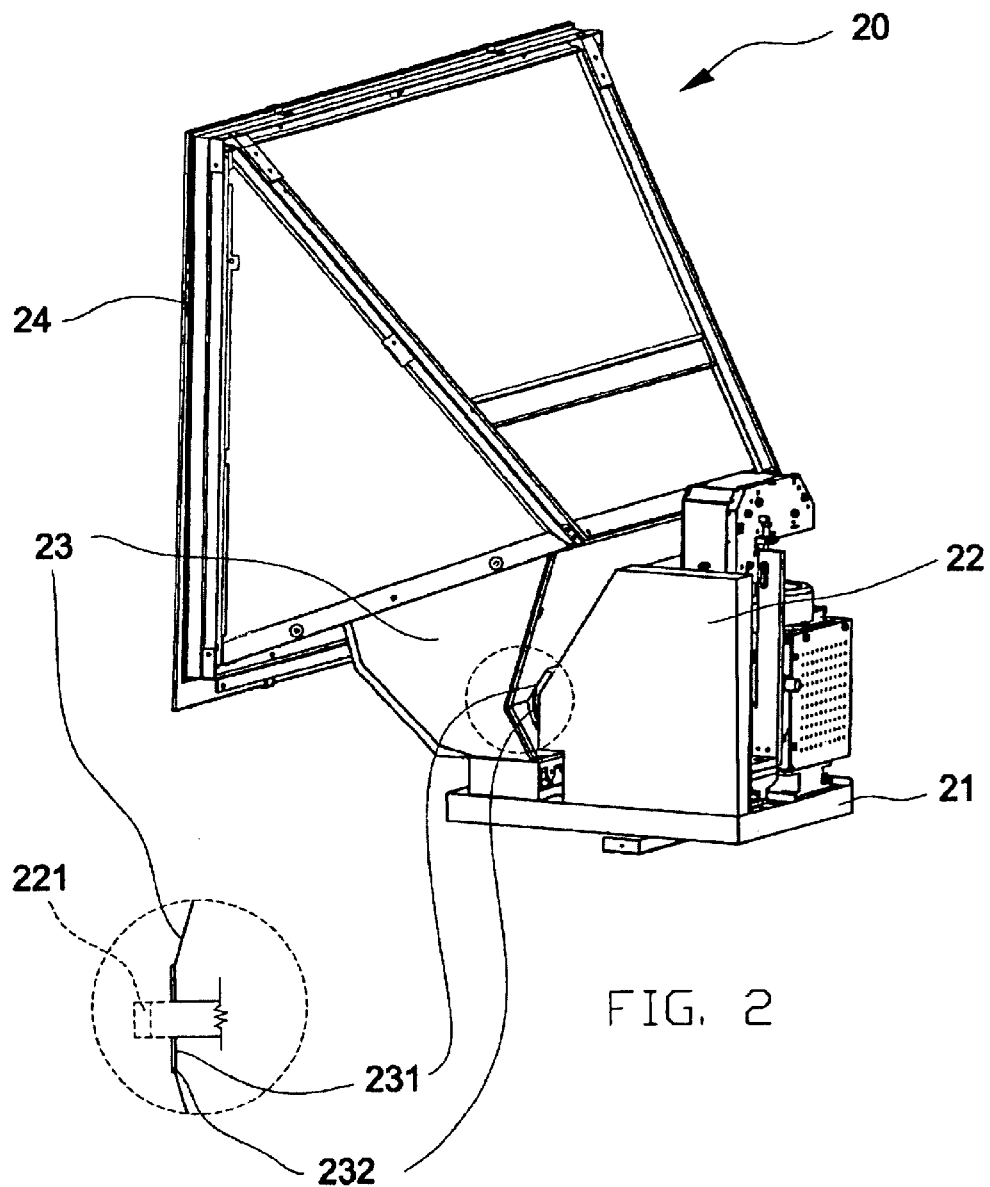
FIG. 2 is a diagram showing perspective view of an optical system structure of a preferred embodiment of the present invention.

Please refer to FIG. 2, the optical assembly for rear projection television, which comprises an optical assembly 20; an optical engine 22 disposed on the lower carrier 21 of the optical assembly 20; a hood member 23 coupled to an end of the carrier 21 in the front of the optical engine 22; an inlet 231 disposed on the hood member 23, the inlet 231 having an elastic sealed cover 232 which allows the projection lens 221 of the optical engine 22 to be extended into the hood member 23 and closely wraps the external diameter of the projection lens 221, and the hood member 23 is extended upward; a screen 24 is disposed at the outlet to constitute an independent structure of the optical assembly 20.

Figure 3:
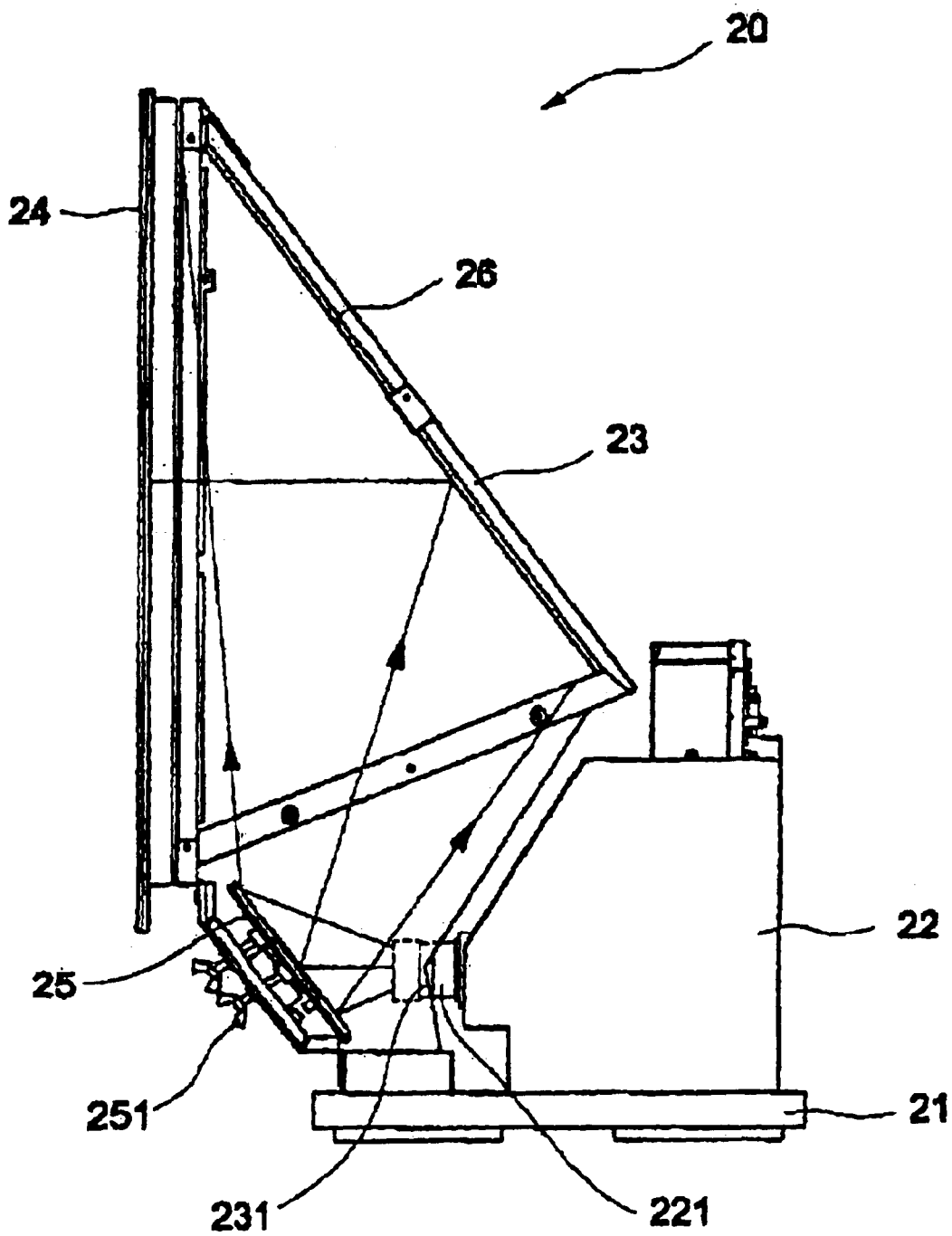
FIG. 3 is a cross-sectional side-view diagram of an optical assembly of the present invention.

Please refer to FIG. 3, the optical assembly for rear projection television, comprises an inlet 231 disposed at the bottom of the hood member 23 that enables the projection lens 221 of the optical engine 22 to extend with an appropriate distance into the hood member 23; a first mirror 25 disposed in front of the projection lens 221 of the optical engine 22 in the hood member 23; a second mirror 26 disposed on the inner side at the top of the hood member 23 along the optical reflective path of the first mirror 25; a screen 24 is fixed to the outlet of the hood member 23 along the optical reflective path of the second mirror 26 such that the entire screen 24 seals the outlet of the hood member 23. Therefore, the present invention basically wraps the projection lens 221 of the optical engine 22, via the optical path through the first mirror 25, the second mirror 26, and the screen 24 by a hood member 23 and a screen 24 according to the "size" of the optical path, and excludes the optical engine 22 of the heat generating components outside, which constitutes an isolated airtight space with the outside to prevent from being affected by external dust, moisture, and temperature.

Figure 4:
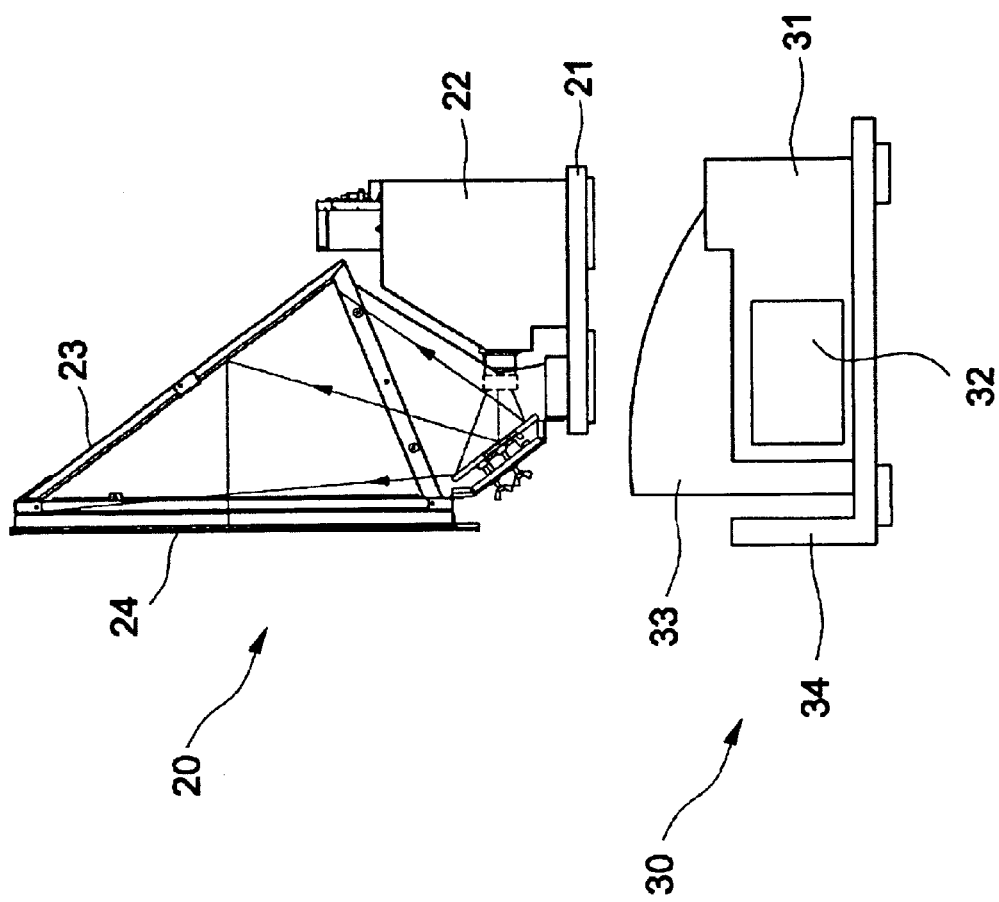
FIG. 4 is an illustrative diagram of an assembling process of the present invention.

Since the optical assembly 20 of the present invention containing components such as the carrier 21, the optical engine 22, the screen 24, the hood member 23, thefist mirror 25 and the second mirror 26 are coupled to the carrier 21 and hood member 23, the relative optical position of each component is fixed. Therefore, the optical assembly 20 so constructed has an independent optical function, and will not be affected by the assembling error of other components of the rear projection television. It shows in FIG. 4 that only the optical assembly 20 needs to be assembled in the clean room when assembling the rear projection television, since it forms a sealed space to prevent the optical components inside the hood member 23 from being contaminated by the external air. It can reduce using the expensive clean room area for lowering cost. Further, in ordinary environment, the carrier 21 of the optical assembly 20 is fixed to a base 30 that has a control panel 34 and couples to the rest of the components including the motherboard 31, power supply 32, and speaker 33 on the base 30, and all these constitute the main functional body of the rear projection television. In the meantime, the remaining heat-generating components such as the motherboard 31 and power supply 32 are isolated outside the hood member 23, so that the optical assembly 20 will not be affected, and further is capable of maintaining the video quality of the screen. And after the rear cover 40 is covered and secured with screws 41, it completes the assembly of the rear projection television in a simple and quick manner. During the maintenance, it only needs to loosen a few screws (not shown in the figure) from the bottom of the base 30 after the rear cover 40 is removed in order to disassemble the optical assembly 20 for maintenance. It does not need to move the whole set of the rear projection television to the clean room for maintenance and repair, and thus makes the maintenance and repair much simpler and more convenient.

Similarly, after the assembling of the optical assembly 20 is completed, an adjusting bolt 251 on the exterior of the hood member 23 is set at the backside of the first mirror 25 if it needs a fine tune and has to prevent removing the sealed hood member 23 that may affect the cleanliness of the interior. The angle of the first mirror 25 can be adjusted by rotating the adjusting bolt 251 from the outside of the hood member 23. Similarly, similar adjusting mechanism can be designed at the backside of the second mirror26 for adjusting the reflectionangle.

The description above shows that the present invention accomplishes the following functions and effects:

1. The present invention includes an independent optical assembly such that It can reduce the manufacturing and assembling error during the assembling of the rear projection television to prevent affecting the precision of the relative position of each optical components in the optical assembly, and thus can maintain the video quality.

2. As to the optical assembly for the rear projection television w of the present invention, it only requires to disassemble the optical assembly to move the optical assembly t for maintenance. It does not need to move the cumbersome rear projection television, which makes the maintenance and repair simpler, easier and more effective.

3. The internal optical components and heat generating components in the optical assembly of the present invention are separated, so that such optical components will not be affected by the heat, and thus can avoid being affected by the optical precision and maintain the video quality of the screen.

4. The screen, the hood member, and the sealed cover of the optical assembly of the present invention constitute the sealed space of the optical system to prevent from being contaminated by the external environment. It only needs to assemble the optical assembly in the clean room when the rear projection television is assembled to reduce manufacturing cost.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures. In addition, theoptical assembly of the present invention constitutes an isolated airtight space from the air outside and prevents being affected by external dust, moisture, and temperature. In summation of the above description, the present invention herein enhances the performance of the conventional method and further complies with the patent application requirements and is submitted to the Patent and Trademark Office for review and granting of the commensurate patent rights.

What is claimed is:

1. An optical assembly for rear projection television, comprising:

carrier;

an optical engine coupled to the carrier for projecting optical information;

a screen receiving and displaying the optical information projected by the optical engine;

at least one mirror which is placed in an optical path between the optical engine and the screen, the mirror being disposed with an adjusting bolt at its backside for adjusting; and a hood member which has an inlet and an outlet and is fixed to the carrier, the inlet being coupled to the optical engine, the outlet being sealed with the screen, the hood member wrapping the optical path from the optical engine to the screen.

* * * * *